United States Patent

[11] 3,588,431

| [72] | Inventors | Adrianus J. Pekelharing; |
| | | Hendrik E. de Bruyn, Delft, Netherlands |
| [21] | Appl. No. | 757,727 |
| [22] | Filed | Sept. 5, 1968 |
| [45] | Patented | June 28, 1971 |
| [73] | Assignee | Cincinnati Milacron Inc. |

[54] METHOD AND APPARATUS FOR ELECTRICAL DISCHARGE MACHINING USING A SUBSTANTIALLY CONSTANT CURRENT DENSITY DURING A SPARK DISCHARGE
12 Claims, 15 Drawing Figs.

| [52] | U.S. Cl.................................................... | 219/69 |
| [51] | Int. Cl..................................................... | B23p 1/08 |
| [50] | Field of Search............................................ | 219/69 (C), |
| | 69 (G), 69 (P), 69 (F), 69 (S) | |

[56] References Cited
UNITED STATES PATENTS

| 2,769,078 | 10/1956 | Matulaitis.................... | 219/69(S) |
| 3,246,113 | 4/1966 | Scarpelli....................... | 219/69(C) |
| 3,283,116 | 11/1966 | Scarpelli....................... | 219/69(P) |

Primary Examiner—R. F. Staubly
Attorney—Frank C. Leach, Jr.

ABSTRACT: A method for maintaining a substantially constant current density during a spark discharge in electrical discharge machining whereby the wear of the tool electrode is reduced substantially. One apparatus includes an inductance and resistor in parallel whereby the resistor produces a predetermined minimum current flow between the workpiece and the tool discharge upon start of current flow therebetween, and the inductance regulates the rate of increase of current from the predetermined minimum current to maintain a substantially constant current density as the area of the discharge increases.

INVENTORS.
A. JOHAN PEKELHARING
HENDRIK E. de BRUYN

BY Frank C. Leach jr.

ATTORNEY.

METHOD AND APPARATUS FOR ELECTRICAL DISCHARGE MACHINING USING A SUBSTANTIALLY CONSTANT CURRENT DENSITY DURING A SPARK DISCHARGE

It has previously been suggested to utilize square pulse current in electrical discharge machining (EDM). By controlling the amplitude, the length, and the frequency of the pulse independently of each other, the tool electrode wear can be substantially reduced in roughing operations. Thus, the relative wear of the tool electrode can be less than 1 percent of the total amount of metal removed from the workpiece during roughing operations. Because a relatively high energy (approximately 1 joule per pulse) is employed in roughing operations, the tool electrode picks up the removed metal from the workpiece so that the tool electrode does not wear away. It is this transfer of the metal from the workpiece to the tool electrode that results in the relatively low wear of the tool electrode during roughing operations. This type of operation produces a surface having an average roughness of about $8 \times 10^1$ meters CLA (center line average). This is approximately 320 microinches.

While the previously suggested removal in EDM of the metal from the workpiece by using square pulse current has satisfactorily reduced the tool electrode wear during roughing, it has not produced any satisfactory reduction in wear of the tool electrode during finishing operations. In a finishing operation, the discharge energy per pulse must be much lower than during roughing and is less than 100 millijoules. This energy is not sufficient to transfer the metal from the workpiece to the tool electrode so that the wear of the tool electrode often is in the range of 10 to 100 percent of the metal removed from the workpiece.

This results in a number of tool electrodes having to be utilized for finishing. The utilization of a number of tool electrodes becomes quite costly and is time consuming. Additionally, the wear of the tool electrode prevents a blind hole or through hole, for example, from being formed by EDM without some taper. Therefore, the use of square pulse current for finishing operations is not satisfactory.

The present invention satisfactorily overcomes the foregoing problem by providing a method for removal of metal from a conductive workpiece by EDM in which the wear of the tool electrode is less than 1 percent of the metal removed from the conductive workpiece. The method of the present invention utilizes a discharge energy in the range of 1 to 11 millijoules per pulse whereby the average roughness of the finished workpiece may be about 0.5 to $2.5 \times 10^{16}$ meters CLA. With the low tool wear, it is possible with proper tool configuration to make very deep and narrow holes in a workpiece with only a minute amount of tapering existing.

The present invention accomplishes this low rate of tool electrode wear by controlling the current density of the spark discharge. Since a spark discharge expands in an ionized gas arc discharge from a small channel at the beginning, the current density of the discharge must be controlled in accordance with this expansion. By maintaining the current density substantially constant throughout the spark discharge, the relatively low rate of tool electrode wear is accomplished.

By maintaining the current density substantially constant as the discharge path or channel increases in size, the heat that is produced during the spark discharge is maintained at a level that the tool electrode is capable of transferring. Thus, there is no vaporization with very little melting of the metal of the tool electrode because of the inability to transfer heat therefrom since the substantially constant current density of the spark discharge limits the temperature of the tool electrode so that the heat may be transferred therefrom.

In the previously suggested removal of metal in EDM in which square pulse current was utilized, the current density was not maintained constant. As a result, the relatively high current density at the start of the spark discharge resulted in the tool electrode being incapable of transferring the heat therefrom. This caused the metal of the tool electrode to vaporize and melt because of the failure to transfer the heat whereby high wear of the tool electrode occurred.

While the controlled current density of the present invention prevents the tool electrode from wearing, the workpiece still melts to form the desired shape due to the spark discharges. This is because the workpiece is formed of a material such as steel, which has a lower thermal conductivity than the material of the tool electrode such as copper, for example. As a result, the method of the present invention prevents wear of the tool electrode while obtaining the desired removal of metal from the workpiece.

The viscosity of the dielectric medium is a determining factor in this invention as to the amount of tool wear relative to the amount of removal of the metal. This is because the dielectric medium in the discharge channel ionizes into a gas from a liquid and the discharge channel expands during the spark discharge. Since a dielectric medium's expansion rate, surrounding the discharge channel, decreases as its viscosity increases, the current density, for a given discharge energy, on the tool and workpiece surface is also increased; thus, excessive heat is developed on the tool surface to cause some of the tool to melt and be expelled whereby wear of the tool results.

When using the method of the present invention, the wear of the tool electrode occurs only at the time of ionization of the dielectric medium. Thus, as the number of spark discharges increases, the wear of the tool electrode increases. Accordingly, the present invention produces its most desirable results when utilized with a dielectric medium of relatively low viscosity. However, even with dielectric mediums of relatively high viscosity, it still produces substantial improvement of tool electrode wear in the order of 50 to 1 over the wear of tool electrodes using square pulse current with the same dielectric medium.

The wear of the total electrode at the time of ionization is due to an initial minimum current that is required to maintain a spark discharge. Thus, in the method of the present invention, an initial minimum current must be produced to sustain the spark discharge. Thereafter, the rate of increase of the current is controlled to maintain a substantially constant current density across the gap during removal of material from the workpiece. As a result, the pulse of the method of the present invention has a substantially trapezoidal shape with the minimum current forming the shorter leg. That is, in the method of the present invention, the current increases along the substantially linear portion of an exponential curve as the area of the spark discharge increases.

Since the wear of the tool electrode is so small when using the method of the present invention, it is not necessary for the tool electrode to have a relatively thick depth as is required for tool electrodes using previously available methods of EDM. Thus, in forming a hole of 50 millimeters in depth, for example, the thickness of the electrode could be approximately 1 millimeter, for example. This compares with a thickness of 50 millimeters for a tool electrode used with the previously suggested method of employing square pulse current. Furthermore, more than one of the tool electrodes of 50 millimeter thickness must be employed.

An object of this invention is to provide a method for removing material from a conductive workpiece by electrical discharge machining in which the wear of the tool electrode is substantially reduced.

Another object of this invention is to provide a method for controlling the current density of the spark discharges in electrical discharge machining.

A further object of this invention is to provide an electrical discharge machining apparatus in which the current density of the spark discharge is controlled.

Other objects of this invention will be readily perceived from the following description, claims, and drawings.

This invention relates to a method for removing material from a conductive workpiece by spark discharges across a machining gap between the workpiece and a tool electrode. The method comprises initiating a spark discharge across the gap by applying a voltage with a predetermined starting current, then maintaining a substantially constant current density across the gap during the spark discharge, and stopping the spark discharge after a predetermined period of time.

This invention also relates to an improvement in an electrical machining apparatus for removing material from a conductive workpiece by spark discharges between the workpiece and a tool electrode. The improvement comprises means to allow current to flow between the workpiece and the tool electrode when a predetermined voltage exists therebetween with means to produce a predetermined minimum current between the workpiece and the tool electrode upon start of current flow therebetween. The rate of increase of current between the workpiece and the tool electrode during the existence of the spark discharge between the workpiece and the tool electrode is controlled by suitable means. Other means stops the spark discharge between the workpiece and the tool electrode.

The attached drawings illustrate preferred embodiments of this invention, in which.

Figure 1:
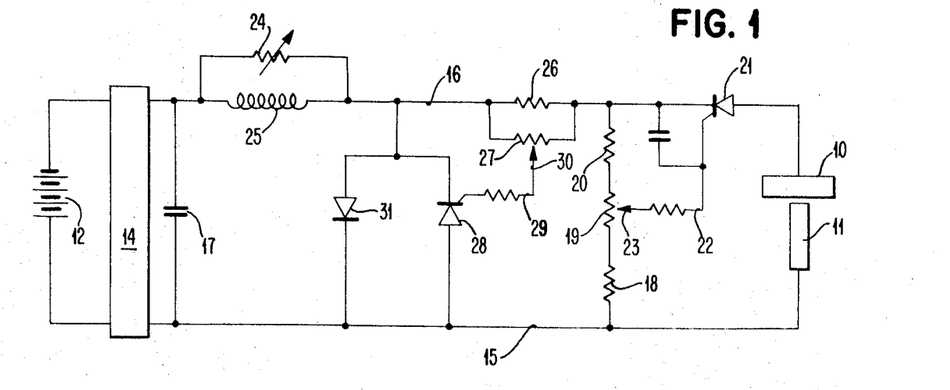
FIG. 1 is a schematic wiring diagram of a circuit of an apparatus of the present invention for practicing the method of the present invention.

Referring to the drawings and particularly FIG. 1, there is shown a circuit for controlling the spark discharges to machine a conductive workpiece 10. The conductive workpiece 10 may be supported on a suitable base (not shown) in the well-known manner. A tool electrode 11 is disposed adjacent to the workpiece 10 and is adapted to be moved toward and away from the workpiece 10 in the well-known manner such as when there is a short circuit therebetween.

The tool electrode 11 is connected to the positive side of a DC supply 12 such as a battery, for example, through a protective circuit 14, which is shown in detail in FIG. 2 and will be described hereinafter. The tool electrode 11 is connected to the positive side of the DC supply 12 by a lead 15 while the workpiece 10 is connected to the negative side of the DC supply by a lead 16. Accordingly, the tool electrode 11 is an anode and the workpiece 10 is a cathode. Thus, when the tool electrode 11 is brought in close proximity to the workpiece 10 with appropriate conditions, sparks result, and metal is removed from the workpiece 10 in the well-known manner of the EDM process.

It should be understood that the tool electrode 11 may be connected to the negative side of the DC supply 12 and the workpiece 10 connected to the positive side if desired. In this arrangement, the workpiece 10 becomes the anode and the tool electrode 11 the cathode. Of course, the metal is removed by spark discharges in the well-known manner of the EDM process.

It should be understood that the EDM process is carried out in a dielectric medium. This dielectric medium is preferably of low viscosity such as kerosene, for example. However, it may be of higher viscosity such as oil, for example, although this results in more wear of the tool electrode than when a low viscosity dielectric medium is employed.

A capacitor 17 is connected between the leads 15 and 16 and is adapted to be charged from the DC supply 12. When the capacitor 17 is charged to a predetermined voltage, the dielectric medium between the tool electrode 11 and the workpiece 10 breaks down and ionizes whereby a spark discharge is created between the tool electrode 11 and the workpiece 10.

Resistors 18, 19, and 20 are connected in parallel with the capacitor 17 between the leads 15 and 16. The resistors 18—20 function as a voltage divider to provide a voltage signal to a silicon controlled rectifier 21. The rectifier 21 has its gate connected to the resistor 19 by a lead 22 having a movable arm 23. Accordingly, positioning of the arm 23 relative to the resistor 19 determines the potential at which the silicon controlled rectifier 21 is turned on. The voltage, which turns on the silicon controlled rectifier 21, is selected to be slightly below that at which the spark discharge occurs between the tool electrode 11 and the workpiece 10.

When the silicon controlled rectifier 21 is turned on, current can flow from the positive side of the DC supply 12 to the negative side of the DC supply 12 through the tool electrode 11 and the workpiece 10. This will occur when a spark discharge exists between the tool electrode 11 and the workpiece 10 due to a sufficient potential to ionize the dielectric medium.

The lead 16 has a resistor 24 and an inductance 25, which are connected in parallel with each other, connected in series with the silicon controlled rectifier 21. The resistor 24 determines the magnitude of the minimum current flowing through the circuit since the parallel combination of the resistor 24 and the inductance 25 appears as a pure resistance when current initially begins to flow. That is, the inductance 25 appears as an infinite resistance. As a result, when current initially flows, there is an abrupt rise in the current; this is determined by the potential across the capacitor 17 divided by the resistance of the resistor 24.

After the current reaches its initial minimum value, the current continues to flow across the gap between the tool electrode 11 and the workpiece 10 as long as the spark discharge exists. The current increases along the substantially linear portion of an exponential curve due to the inductance 25.

As the current increases, its magnitude is sensed by a resistor 26, which is in parallel with a resistor 27, in the lead 16. A silicon controlled rectifier 28 has its gate connected to the resistor 27 by a lead 29, which has a movable arm 30 for cooperation with the resistor 27.

As a result, the current, which causes the silicon controlled rectifier 28 to be turned on, may be selected through proper positioning of the arm 30. Thus, movement of the arm 30 to the right causes a lower current to be required to turn on the silicon controlled rectifier 28 while moving the arm 30 to the left causes a higher current to be required to turn on the silicon controlled rectifier 28.

The silicon controlled rectifier 28 is disposed in parallel with a diode 31. The parallel combination of the silicon controlled rectifier 28 and the diode 31 is connected to the lead 15. It should be understood that a small inductance may be employed between the diode 31 and the lead 15 to limit the rate of current flow through the diode 31 if desired.

The current flow through the gap between the tool electrode 11 and the workpiece 10 continues to rise approximately linearly due to the inductance 25 until the current reaches a selected or predetermined value. This is determined by the position of the arm 30.

When the silicon controlled rectifier 28 is turned on due to the current across the gap between the tool electrode 11 and the workpiece 10 reaching the predetermined or selected value, the current is shunted through the silicon controlled rectifier 28 rather than flowing across the gap.

When the current flow shunts the gap between the tool electrode 11 and the workpiece 10, the voltage across the gap drops below that required to maintain the spark discharge therebetween. As a result, the spark discharge is extinguished and current no longer flows through the gap. When current through the gap is stopped, it no longer flows through the silicon controlled rectifier 21 whereby the rectifier 21 is turned off.

The current continues to flow through the silicon controlled rectifier 28 and the parallel combination of the inductance 25 and the resistor 24. This causes charging of the capacitor 17 in the reverse or negative direction. When the charge on the capacitor 17 is completely reversed, the diode 31 conducts. When current flow occurs through the diode 31, the silicon controlled rectifier 28 is turned off. Then, the capacitor 17 again begins to charge from the positive side of the DC supply 12 through the lead 15, and another cycle begins.

Considering the operation of the circuit of FIG. 1 and referring to FIGS. 3a—3d, the charge on the capacitor 17 (see FIG. 3b) turns on the silicon controlled rectifier 21 at time $t_o$ during the initial cycle. In this initial cycle, the voltage across the gap drops at the same instance to produce a spark discharge. As a result, the minimum current through the gap and the silicon controlled rectifier 21 (see FIG. 3c) occurs at time $t_o$.

The current across the gap and through the silicon controlled rectifier 21 increases approximately linearly due to the inductance 25 until time $t_1$. At $t_1$, the silicon controlled rectifier 28 is turned on due to the current through the gap and the silicon controlled rectifier 21 reaching its predetermined or selected value as indicated at 33 (see FIG. 3c). Thus, at $t_1$, current starts to flow through the silicon controlled rectifier 28 (see FIG. 3d) and the potential across the gap drops to zero and current flow through the gap and the silicon controlled rectifier 21 stops (see FIG. 3c) at $t_1$.

Figures 3A, 3B:
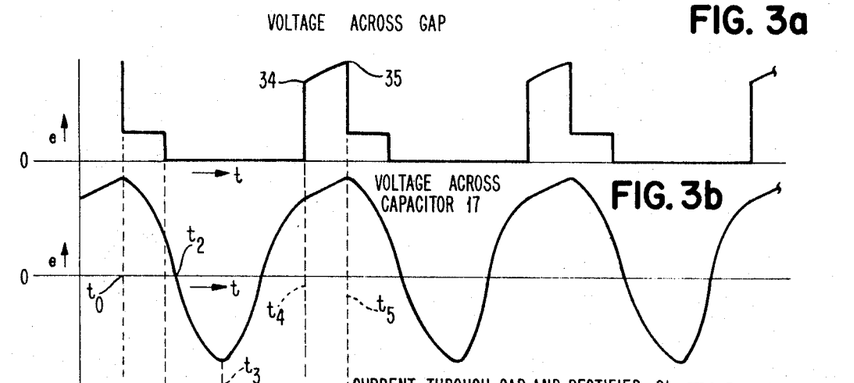
FIGS. 3a—3d are timing charts showing the relation of various currents and voltages in the circuit of FIG. 1.
Figure 3C:
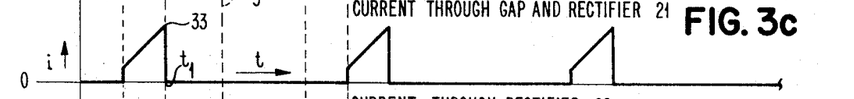
Figure 3D:
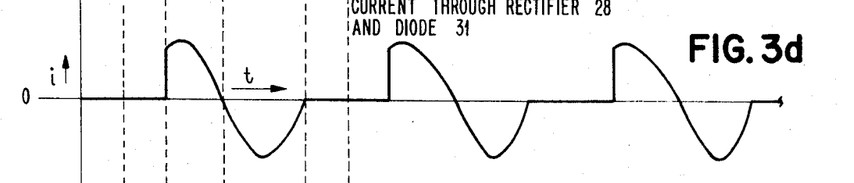

The capacitor 17 continues to discharge until time $t_2$ (see FIG. 3b). At $t_2$, the capacitor 17 starts to charge in the opposite or reverse direction due to flow of the current through the silicon controlled rectifier 28 and the parallel combination of the resistor 24 and the inductance 25. When the reverse charge on the capacitor 17 reaches a maximum value at time $t_3$ due to current flow through the silicon controlled rectifier 28 and the parallel combination of the resistor 24 and the inductance 25, the current begins to flow through the diode 31 and ceases to flow through the silicon controlled rectifier 28. This is shown in FIG. 3d with the current through the silicon controlled rectifier 28 being above the zero line and the flow through the diode 31 being below the zero line.

The capacitor 17 discharges through the diode 31. When the reverse charge, which has been placed on the capacitor 17 due to the flow of current through the silicon controlled rectifier 28, has been dissipated through the diode 31, the capacitor 17 is again charged from the positive side of the DC supply 12. When the charge on the capacitor 17 reaches a predetermined or selected value, the silicon controlled rectifier 21 is again turned on; this is at time $t_4$. When the silicon controlled rectifier 21 is turned on at $t_4$, the voltage across the gap increases from zero to that indicated at 34. However, this voltage is not sufficient to cause a spark discharge across the gap.

Accordingly, the capacitor 17 continues to charge until the voltage across the gap reaches that indicated at 35 in FIG. 3a. This is at time $t_5$, and this voltage is sufficient to produce a spark discharge across the gap so that current flows through the gap and the silicon controlled rectifier 21. The remainder of the cycle is the same as that previously described.

The minimum starting current is determined by the value of the resistor 24. The current at which the silicon controlled rectifier 28 is turned on, whereby flow of current through the silicon controlled rectifier 21 ceases and the spark discharge is extinguished, is determined by the magnitude of the resistor 27, and the magnitude of the inductance 25 determines the rate of current rise or slope of the current pulse. Thus, the resistors 24 and 27 and the inductance 25 are variable.

The position of the arm 23 determines the voltage at which the silicon controlled rectifier 21 is turned on. Likewise, the current at which the silicon controlled rectifier 28 is turned on is determined by the position of the arm 30.

Since an EDM apparatus has many extended shorts, it is necessary to protect the circuit of FIG. 1 from these shorts. The protective circuit 14 serves this function.

Figure 2:
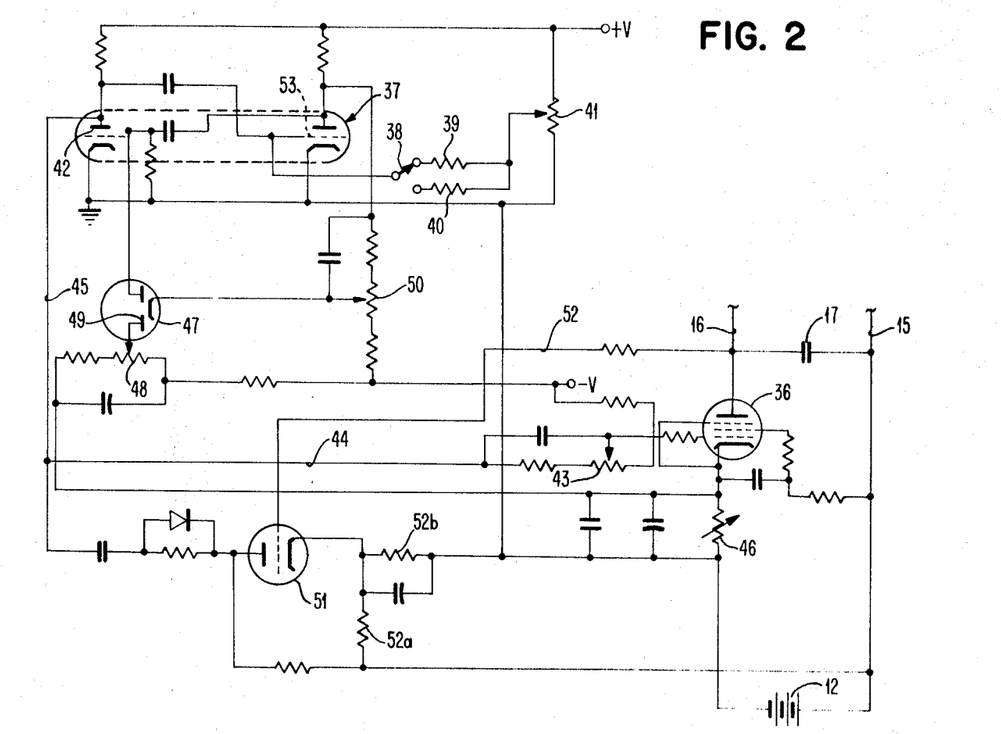
FIG. 2 is a schematic wiring diagram of a protective circuit utilized with the circuit of FIG. 1.

Referring to FIG. 2, the protective circuit 14 is shown in conjunction with the DC supply 12 and the capacitor 17. The remainder of the circuit of FIG. 1 has been omitted. The negative lead 16 is returned to the negative side of the DC supply 12 through a pentode tube 36, which is preferably a 6JE6A tube.

It should be understood that 18 of the tubes 36 are connected in parallel with each other to provide sufficient current flow to the gap. The current capacity of each of the tubes 36 is so small that 18 of the tubes 36 are required to provide the desired current. However, only one of the tubes 36 is shown, and the description will refer to only a single tube.

When the current in the negative lead 16 becomes excessive due to an extended short, the tube 36 is turned off by the circuit of FIG. 2. As a result, the circuit of FIG. 1 is protected against extended shorts.

The protective circuit 14 of FIG. 2 includes a multivibrator, which may be free running or astable. The multivibrator includes a dual triode tube 37, which is preferably a 12AT7 tube, and its associated circuitry. The plates of the tube 37 have a positive potential of 275 volts connected thereto while their cathodes are grounded.

The multivibrator may operate about two center frequencies of approximately 2,000 Hz. and 8,000 Hz. These are determined by whether a switch 38 is connected through a resistor 39 or a resistor 40 and a potentiometer 41 to the positive voltage supply source of 275 volts. Changes about the two center frequencies are obtained through varying the position of the arm of the potentiometer 41.

The grid of the tube 36 is connected to a plate 42 of the tube 37 by a potentiometer 43, a lead 44, and a lead 45. Thus, if the plate 42 of the tube 37 is the side of the tube 37 that is not conducting and the potentiometer 43 has its arm appropriately adjusted, the tube 36 is forced into its maximum current carrying condition. With the tube 36 in its maximum current carrying condition, the capacitor 17 is rapidly charged.

If an excessive current is drawn by the circuit of FIG. 1 due to an extended short (This can occur when the silicon controlled rectifiers 21 and 28 conduct at the same time.), the voltage drop through a resistor 46, which is connected to the cathode of the tube 36 and the negative side of the DC supply 12, becomes exceedingly large. This results in a diode 47, which is preferably a 6AL5 tube, being activated. It is necessary that a potentiometer 48, which is connected to a plate 49 of the diode 47, and a potentiometer 50, which is connected to the cathode of the diode 47, be properly adjusted for the diode 47 to be forward biased when the current flow through the resistor 46 indicates an extended short.

When the diode 47 conducts, the left side of the tube 37 is turned on and the right side of the tube 37 is turned off. When the left side of the tube 37 turns on, the potential at the plate 42 decreases substantially whereby the grid of the tube 36, which is connected to the plate 42, becomes negative to turn the tube 36 off and stop current flow therethrough. As a result, current cannot flow through the circuit of FIG. 1.

When the capacitor 17 goes through its voltage reversal under normal machining operations, a triode 51, which is preferably a 12AX7 tube, conducts. This is due to its grid being connected through a lead 52 to the lead 16. The plate of the capacitor 17 connected to the lead 16 becomes positive with respect to the plate connected to the lead 15. The lead 15 is connected through a voltage divider, which comprises resistors 52a and 52b, to the cathode of the tube 51.

The pulse, which is produced by the turning on of the triode 51 and supplied through the lead 45 to grid 53 of the right side of the tube 37, causes the grid 53 to become negative; as a result, the left side of the tube 37 is turned on. Thus, this arrangement insures that the left side of the tube 37 turns off the tube 36 to permit reverse charging of the capacitor 17. Due to the frequency of the free running multivibrator, the left side of the tube 37 is turned off to turn on the tube 36 in time to charge the capacitor 17 from the positive side of the DC supply 12 during the next cycle. Thus, the tube 36 is always turned on by the left side of the multivibrator being turned off before the next charging cycle is to occur. For most efficient operation, the potentiometer 41 should be adjusted so that the frequency of the free running multivibrator is slightly greater than the natural frequency of the circuit of FIG. 1.

When utilizing the method of the present invention, it is not necessary for the tool electrode 11 to be completely formed of a conductive metal. For example, the tool electrode need only have its outer surface formed of a conductive metal whereby its core could be formed of any suitable material of relatively low cost such as plaster, for example. This is because of the very minute amount of wear that occurs on the tool electrode 11 when using the method of the present invention.

In EDM apparatuses in which square pulses are employed, the entire tool electrode must be made of the conductive material. This is because of the substantial wear of the tool electrode that occurs during finishing operations. If only a very thin film of the metal were employed, this film would wear away so rapidly that there could be no removal of metal from the workpiece. Thus, the method of the present invention permits a tool electrode of relatively low cost to be utilized.

Furthermore, only a single tool electrode is required when utilizing the method of the present invention. When using square pulses, several tool electrodes are required to complete a hole of any depth. Furthermore, each of these tool electrodes must have a substantial thickness. For example, in forming a hole having a depth of 50 millimeters with the method of the present invention, the tool electrode 11 may have a thickness as small as 1 millimeter. The required thickness for the tool electrode in the square pulse method would be 50 millimeters. Additionally, more than one of the tool electrodes with the thickness of 50 millimeters would be required to finish the hole. Thus, a substantial decrease in tool electrode cost results from using the method of the present invention to finish the surface of the hole. Additionally, the problem of tapering in a blind or through hole is not present when using the method of the present invention as it is when using the square pulse method.

When the method of the present invention is used with small cross-sectional areas, it is not necessary to have flow of the dielectric medium through the gap. For example, if the area is under 3 cm.$^2$, then forced gap flushing is not required.

Figure 4:
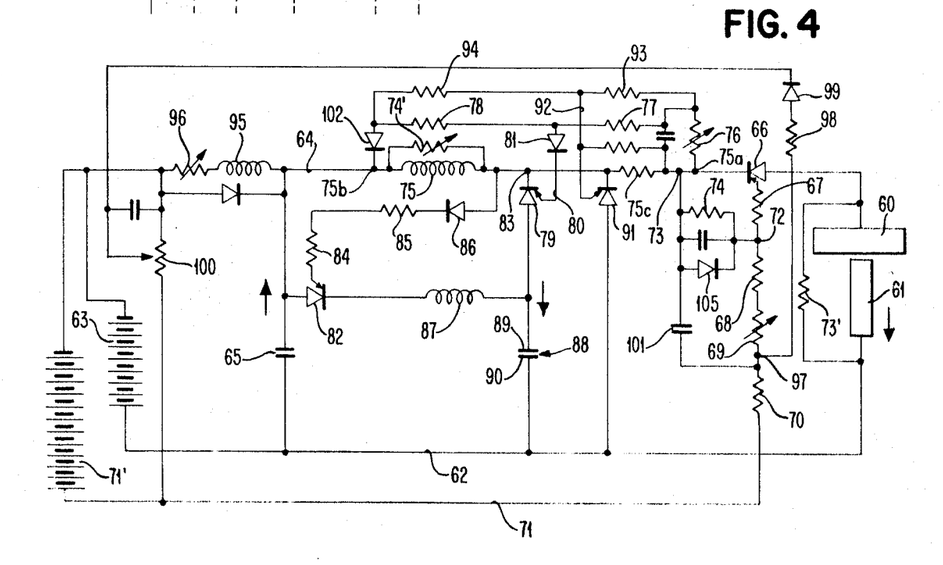
FIG. 4 is a schematic wiring diagram of another circuit for practicing the method of the present invention.

Referring to FIG. 4, there is shown another circuit for controlling the current density across a gap between a conductive workpiece 60 and a tool electrode 61. The workpiece 60 and the tool electrode 61 are similar to the workpiece 10 and the tool electrode 11.

The tool electrode 61 is connected by a lead 62 to the positive side of a DC supply 63. The workpiece 60 is connected by a lead 64 to the negative side of the DC supply 63. The voltage of the DC supply 63 is preferably 130 volts.

A capacitor 65 is connected between the leads 62 and 64 and is adapted to be charged by the DC supply 63. When the capacitor 65 is charged to a predetermined voltage, the dielectric medium between the tool electrode 61 and the workpiece 60 breaks down and ionizes whereby a spark discharge is created between the tool electrode 61 and the workpiece 60 provided that a silicon controlled rectifier 66 is turned on.

The gate of the silicon controlled rectifier 66 is connected through resistors 67—70 and a lead 71 to a DC supply 71'. This is preferably a potential of 220 volts.

The silicon controlled rectifier 66 is turned on when the potential at a point 72, which is at the junction of the resistors 67 and 68, is sufficiently positive with respect to a point 73 on the lead 64. Thus, the ratio of a resistor 74, which is between the points 72 and 73, to the sum of the resistors 68—70 determines the voltage applied to the gate of the silicon controlled rectifier 66. As a result, current may flow through the gap between the tool electrode 61 and the workpiece 60 when a spark discharge is created by the voltage from the capacitor 65.

When the silicon controlled rectifier 66 is turned on, ionization occurs across the gap between the tool electrode 61 and the workpiece 60 due to the charge on the capacitor 65. This is a spark discharge between the tool electrode 61 and the workpiece 60 whereby current flows through the gap.

If gap ionization does not occur at the instant that the silicon controlled rectifier 66 is turned on, it is necessary to maintain the silicon controlled rectifier 66 in a conducting state until the gap is ionized. Accordingly, a resistor 73' is connected between the workpiece 60 and the tool electrode 61 to permit sufficient current to flow therethrough to maintain the silicon controlled rectifier 66 in a conducting state until the gap is ionized.

Since the resistor 69 is a variable resistor, its resistance is selected to determine the potential between the points 72 and 73 that triggers the silicon controlled rectifier 66. The resistance of the resistor 69 is selected to insure that the silicon controlled rectifier 66 turns on at a potential sufficient for ionization.

The lead 64 has a resistor 74' and an inductance 75, which are connected in parallel with each other, connected in series with the silicon controlled rectifier 66. The resistor 74' determines the magnitude of the minimum current flowing through the circuit since the parallel combination of the resistor 74' and the inductance 75 appears as a pure resistance when current initially begins to flow. That is, the inductance 75 appears as an infinite resistance. As a result, when current initially flows, there is an abrupt rise in the current; this is determined by the potential across the capacitor 65 divided by the resistance of the resistor 74'.

After the current reaches its initial minimum value, the current continues to flow across the gap between the tool electrode 61 and the workpiece 60 as long as the spark discharge exists. During this time, the current increases exponentially due to the inductance 75. In the portion of the exponential curve used, this rise of the current is substantially linearly.

As the current increases, there is a voltage drop between points 75a and 75b due to the parallel combination of the inductance 75 and the resistor 74' in series with a resistor 75c. The current magnitude is sensed by resistors 76—78, which are disposed in parallel with the inductance 75 and the resistor 75c.

A silicon controlled rectifier 79, which has its anode connected to the lead 62 through a capacitor 88 and its cathode connected to the lead 64 at point 83, has its gate connected by a lead 80 and a diode 81 to a point between the resistors 77 and 78. Since the ratio of the resistance of the resistor 78 to the sum of the resistances of the resistors 76 and 77 determines when the silicon controlled rectifier 79 is turned on, varying the resistance of the variable resistor 76 selects the peak current at which the discharge is terminated.

This is because the current is shunted through the silicon controlled rectifier 79 whenever the silicon controlled rectifier 79 is turned on. As a result, the discharge through the gap is extinguished and current no longer flows through the gap.

Current continues to flow through the silicon controlled rectifier 79 and the inductance 75. The inductance 75 and the capacitor 88 in series with the capacitor 65 constitute an LC oscillator. By making the capacitor 88 considerably smaller than the capacitor 65, the time constant of the LC circuit is governed by the capacitor 88.

With the inductance 75 and the capacitors 65 and 88 constituting the LC oscillator, an oscillation starts. Accepting the simplification that the capacitor 65 is infinitely greater than the capacitor 88, the voltage of the capacitor 88 will oscillate around the level of the voltage of the capacitor 65. Thus, the capacitor 88 is charged with a reverse polarity. In reality, the capacitor 65 is not infinitely great so that the voltage across capacitor 65 decreases a little.

When the reverse charge on the capacitor 88 has reached its maximum value, then the current has been decreased to zero so that the silicon controlled rectifier 79 is turned off.

At this time, the anode of a silicon controlled rectifier 82 and its gate have the same potential and the cathode is negative with respect to the anode due to the potential on the capacitors 65 and 88. As a result, the silicon controlled rectifier 82 is turned on. The gate of the silicon controlled rectifier 82 is connected to the lead 64 between the inductance 75 and the point 83, which is the connection of the cathode of the rectifier 79 to the lead 64, by a current limiting resistor 84, a resistor 85, and a diode 86.

When the silicon controlled rectifier 82 is turned on, the capacitor 88 discharges its reverse or negative charge through the rectifier 82 and an inductance 87. The capacitor 88 charges so that its plate 89 becomes positive with respect to its plate 90. When the capacitor 88 discharges through the silicon controlled rectifier 82 and the inductance 87, its charge is again reversed. At the instant when the capacitor 88 has the maximum positive charge on its plate 89, the current through the silicon controlled rectifier 82 drops to zero whereby the silicon controlled rectifier 82 is turned off.

In the meantime, the charge of capacitor 65 is supplied from the positive side of the DC supply 63. Another cycle may begin already while the charge of the capacitor 88 is reversed through the rectifier 82.

A silicon controlled rectifier 91 extends between the leads 62 and 64 in parallel with the silicon controlled rectifier 79 and its capacitor 88 and in parallel with the gap and the rectifier 66. The silicon controlled rectifier 91 is capable of carrying a relatively high current whereas the silicon controlled rectifiers 66, 79 and 82 are low current but higher frequency rectifiers. Accordingly, the silicon controlled rectifier 91 is utilized to provide protection against shorts when current, due to a short, would damage the silicon controlled rectifiers 66 and 79.

The silicon controlled rectifier 91 also serves the important function of causing a positive charge to be placed on the plate 89 of the capacitor 88 when initial operation of the apparatus begins.

This is because the plate 89 has no voltage with respect to the point 83 or is negative because the rectifier 79 has a leakage current in the nonconductive direction when the circuit is turned on. Without the plate 89 being positive with respect to the point 83, there would be no way to turn off the rectifier 66 when the current flowing through the circuit reaches the value at which it is desired to turn off the rectifier 66 by shunting the current through the rectifier 79. Without the plate 89 of the capacitor 88 being positive with respect to the point 83, the rectifier 79 cannot turn on irrespective of the trigger signal to its gate through the diode 81.

Accordingly, in the first cycle of operation, the silicon controlled rectifier 91 is turned on since it has its gate connected through a lead 92 to a point between resistors 93 and 94. The resistors 93 and 94 are connected in parallel with the resistors 77 and 78 and are connected in series with the variable resistor 76. Accordingly, when current flowing through the gap slightly exceeds that required to turn on the rectifier 79, the silicon controlled rectifier 91 is turned on. The current is then shunted through the rectifier 91 to charge the capacitor 65 in the reverse or negative direction through the inductance 75. It should be understood that the initial cycle is usually a short since the dielectric medium is clean.

When the capacitor 65 is charged in the reverse direction, the rectifier 82 is turned on, as a result of the positive voltage of the point 83 with respect to the plate 89, so that the plate 89 of the capacitor 88 is made positive with respect to the plate 90. Accordingly, the rectifier 91 serves to initiate operation of the circuit of FIG. 4.

Furthermore, if the rectifier 79 should fail to turn on for some reason, then the rectifier 91 is turned on. This is when a current, slightly in excess of that at which it is desired to turn off the rectifier 66 during a normal machining cycle, exists. Thus, the silicon controlled rectifier 91 protects the silicon controlled rectifiers 66 and 79 from damage.

The rectifier 79 can fail to turn on when there is a partial short between the electrode 61 and the workpiece 60 caused by an insufficiently clean dielectric medium. In that case, the discharge passes very irregularly with the above mentioned result.

Accordingly, the lead 64 has an inductance 95 and a variable resistor 96 between the connection of the capacitor 65 to the lead 64 and the negative side of the DC supply 63. The inductance 95 and the resistor 96 cooperate to limit current of the charging capacitor 65 during the period the rectifier 91 is turned on. If this current was not limited, it would not be possible to charge the capacitor 65 in the reverse direction. When the capacitor 65 is completely charged in the reverse direction, the current through the silicon controlled rectifiers 66 and 91 drops to zero whereby both of the rectifiers 66 and 91 are turned off.

As previously mentioned, this discharge of the capacitor 65 results in the plate 89 of the capacitor 88 becoming positive with respect to the plate 90 of the capacitor 88. As a result, during the next machining cycle, the rectifier 79 may be turned on when the current reaches the predetermined or selected value at which it is desired to stop the machining cycle by shunting the current flowing through the gap.

It should be understood that the plate 90 of the capacitor 88 becomes positive while the plate 89 becomes negative after the silicon controlled rectifier 79 is turned on to permit current flow from the positive lead 62 through the rectifier 79 to the negative lead 64. However, when the rectifier 79 is turned off, the reverse charge on the capacitor 65 discharges through the rectifier 82. As a result, the desired charges of the plate 89 being positive and the plate 90 being negative are again produced. Thus, after the first cycle, the capacitor 88 always has the correct charge on its plate 89 to insure that the rectifier 79 conducts whenever a trigger signal is supplied thereto through the lead 80.

The capacitor 88 has to be as small as possible to obtain a short oscillating time of the LC circuit and, as a result of this, a high pulse frequency. There is a minimum value, because a smaller value of the capacitor 88 causes a higher reverse voltage after the rectifier 79 is turned on, since the energy of the inductance 75 is transferred then totally into the capacitor 88. The capacitor 65 has to be substantially greater. In fact, the capacitor 65 is a smoothing capacitor as long as the rectifier 91 is not turned on. The value of the capacitor 65 cannot be increased unlimited because the oscillating time of the LC-circuit with the inductance 75 determines the time of a cycle when the rectifier 91 has been turned on. As an example, the capacitor 88 may have a capacitance in the range of 0.47—1 microfarad depending on the desired frequency of operation while the capacitor 65 would have a capacitance of 25 microfarads.

Furthermore, by making the inductance 87 much smaller than the inductance 75, the time to restore the capacitor 65 to its original state is substantially less than would be required if the inductance 87 were not in the circuit. For example, the inductance 75 may be 0.2 millihenry while the inductance 87 is 0.05 millihenry. Thus, the total time for reverse charging and then discharging the reverse charge on the capacitor 88 is substantially reduced when utilizing the inductance 87 in comparison with the time required if it was not present.

When the silicon controlled rectifier 79 is turned on, the energy in the inductance 75 is transferred to the capacitors 88 and 65. Thus, these capacitors charge to the voltage that is necessary to store this energy. As a result, this voltage may be relatively high such as 400 volts, for example. Thus, the silicon controlled rectifier 79 must not only be a high frequency, low current silicon controlled rectifier but it also must be a high voltage rectifier.

When the silicon controlled rectifier 79 is turned on, there is no current flow through the silicon controlled rectifier 66 so that the points 73 and 83 are at the same potential. As a result, this makes the cathode of the silicon controlled rectifier 66 very negative and the trigger very positive since the gate is connected through the lead 71 to the DC supply 71'. Because of this wide range of potential between the gate and the cathode, the rectifier 66 could be turned on.

To avoid this, a lead is connected from point 97 to the lead 71 and includes a resistor 98, a diode 99, and a variable resistor 100. This maintains the point 97 at a voltage, which is lower than a predetermined value.

Prior to a discharge through the gap, the point 73 is more negative than the point 97 since the point 73 has the potential of the plate of the capacitor 65 connected to the lead 64. When a discharge occurs across the gap, current flows through the silicon controlled rectifier 66 to increase the potential at the point 73 to that of the anode of the rectifier 66; this is only slightly below the potential of the DC supply 63. This causes the point 73 to become positive with respect to the point 97. It should be understood that the arm of the resistor 100 is adjusted so that the maximum voltage at the point 97 is less than the potential at the point 73 when a discharge occurs.

With the point 97 more negative than the point 73, the charge on a capacitor 101, which is connected between the points 73 and 97, is reversed. This results in the gate of the silicon controlled rectifier 66 becoming more negative than the cathode.

When the silicon controlled rectifier 79 is turned on, the silicon controlled rectifier 66 is turned off because current is no longer flowing through the gap. When this occurs, the cathode of the silicon controlled rectifier 66 has the same potential as the point 83, which is connected to the plate 89 of the capacitor 88 since the rectifier 79 is turned on. Since the plate 89 of the capacitor 88 becomes very negative during the time that the rectifier 79 is turned on, the cathode of the silicon controlled rectifier 66 becomes very negative.

When the cathode of the silicon controlled rectifier 66 starts to become very negative due to the rectifier 66 being turned off, the capacitor 101 is reversed charged with its RC time being determined by the resistance of the resistor 69. By properly selecting the RC time constant, the point 97 does not become sufficiently positive with respect to the point 73 to turn on the silicon controlled rectifier 66 until the silicon controlled rectifier 79 has turned off.

The RC time constant of the capacitor 101 is selected so that the point 97 does not become positive with respect to the point 73 until after the silicon controlled rectifier 79 is turned off and the silicon controlled rectifier 82 is turned on. When this occurs, the cathode of the silicon controlled rectifier 66 becomes positive since the cathode of the rectifier 66 receives its potential from the plate of the capacitor 65 connected to the lead 64.

Since the potential on the plate of the capacitor 65 connected to the lead 64 is decreasing due to its discharge through the rectifier 82, the potential of the cathode of the silicon controlled rectifier 66 decreases so that the point 97 becomes more positive with respect thereto. Accordingly, when the point 97 becomes sufficiently positive with respect to the point 73, the silicon controlled rectifier 66 turns on.

Both the capacitor 101 and the capacitor 88 must have their values selected in accordance with the frequency of operation. However, the frequency of operation of the cycles is determined by the resistance of the variable resistor 69. This is because the resistor 69 determines when the rectifier 66 is turned on to allow current to flow through the gap whereby a spark discharge may occur to create a machining cycle.

In order to protect the circuits for triggering the silicon controlled rectifiers 79 and 91 from receiving any negative signal, a diode 102 is disposed in the parallel circuit of the resistors. Thus, the rectifiers 79 and 91 can only be triggered when point 75b has a lower potential than that at point 73.

A diode 105 is employed in the trigger circuit for the silicon controlled rectifier 66. Thus, the diode 105 avoids a negative gate current during the reversed voltage of the capacitor 101 as the diode 81 avoids a negative current during the reversed voltage of the capacitor 88.

The resistor 78 and 94 connect the gates of the rectifiers 79 and 91, respectively, with point 75b. As a result, the determined value of the current through the gap, at which the rectifiers are turned on, is reduced when the slope of the pulse decreases. A decreased slope may occur when there is a pollution in the gap forming an ohmic resistance. In this case, pulses of very long duration are prevented.

Figure 5A:
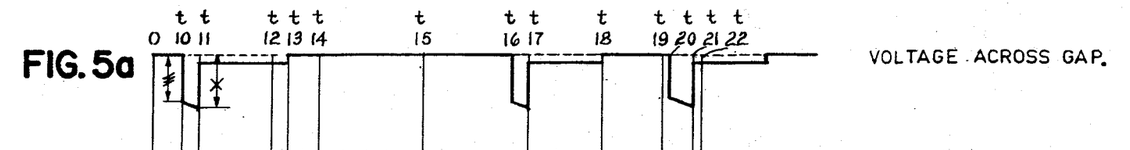
FIGS. 5a—5h are timing charges showing the relation of various currents and voltages in the circuit of FIG. 4.
Figures 5B, 5C, 5D:
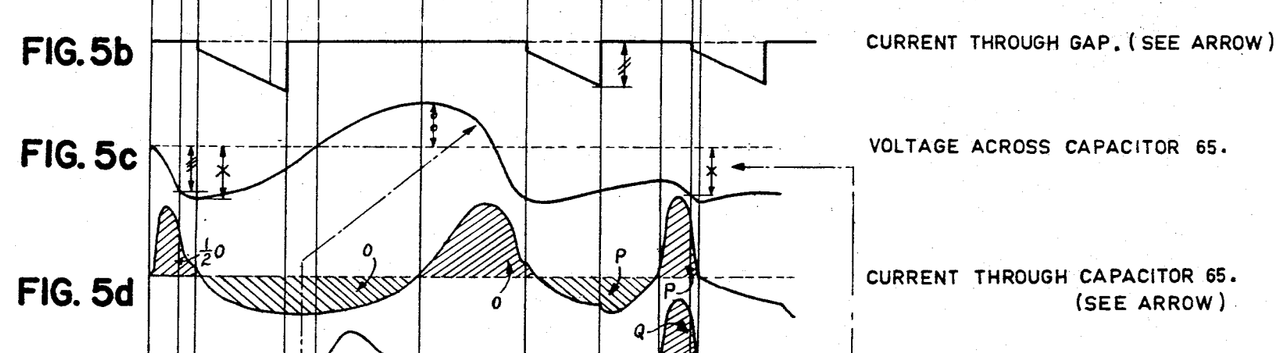
Figures 5E, 5F, 5G, 5H:
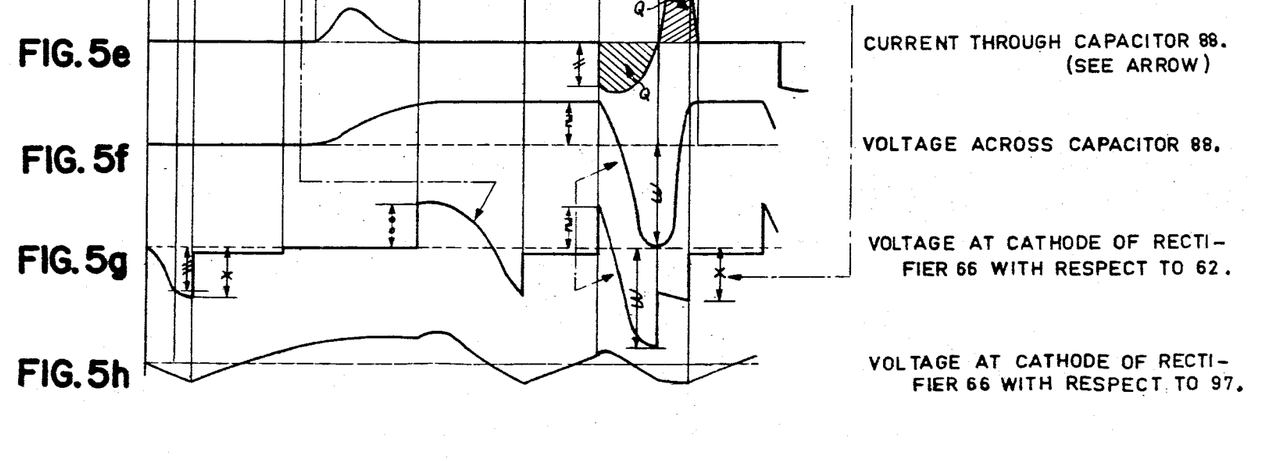

Considering the operation of the circuit of FIG. 4 and referring to FIGS. 5a—5h wherein the reference zero voltage in FIGS. 5a—5g is the voltage on the lead 62 while in FIG. 5h the reference voltage is the voltage at the point 97, the turning on of the circuit results in the capacitor 65 charging through the inductance 95 and the resistor 96 and the rectifier 66 being turned on at time $t_{10}$ as indicated in FIG. 5a by the drop in voltage across the gap. The rectifier 66 is turned on just slightly before the capacitor 65 reaches the potential at which a spark discharge may occur across the gap between the tool electrode 61 and the workpiece 60. This ionization is indicated at time $t_{11}$. As previously mentioned, the plate 89 of the capacitor 88 is not positive with respect to the point 83 during the initial cycle. Accordingly, the rectifier 79 cannot be turned on as the current through the gap increases; this would occur at time $t_{12}$ if the rectifier 79 could be turned on. However, the rectifier 91 is turned on at time $t_{13}$, which is shortly after the time $t_{12}$ at which the rectifier 79 would normally be turned on. As a result, the rectifier 66 is turned off and the capacitor 65 is reverse charged.

Then, when the capacitor 65 reaches the value at which the rectifier 82 conducts (This is at time $t_{14}$.), a part of the charge of the capacitor 65 discharges through the inductance 87 and the capacitor 88. As a result, the capacitor 88 has its plate 89 become positive and its plate 90 become negative as shown in FIG. 5f.

The completion of the discharge of the capacitor 65 through the inductance 75 and the rectifier 91 occurs at time $t_{15}$ after which charging in the opposite direction through the inductance 95 and the resistor 96 occurs.

The next cycle occurs through turning on the rectifier 66 at time $t_{16}$. Then, at time $t_{17}$, which is slightly after the rectifier 66 is turned on, ionization occurs so that the spark discharge occurs across the gap. The silicon controlled rectifier 79 conducts at time $t_{18}$, which is a predetermined period of time after ionization and during which the rate of increase of the current is controlled so that the current density is maintained substantially constant across the gap between the tool electrode 61 and the workpiece 60. The rate of increase of the current is controlled through the magnitude of the inductance 75.

As a result, the spark discharge across the gap is extinguished at the time $t_{18}$. Furthermore, the capacitor 88 is reverse charged through the silicon controlled rectifier 79 and the inductance 75. When the capacitor 88 reaches a reverse charge that causes the rectifier 82 to be turned on at time $t_{19}$, the reverse charge of the capacitor 88 is discharged through the inductance 87. The loss of charge of the capacitor 65 may again be supplied from the lead 62 through the inductance 95 and the resistor 96 to the negative side of the DC supply 63. By controlling the value of the resistor 69, the rectifier 66 is turned on just before the potential of the capacitor 65 becomes sufficient to cause ionization of the dielectric medium in the gap whereby another machining cycle may occur.

The current flow through the silicon controlled rectifiers 79 and 82 is shown in FIG. 5e. The current through the silicon controlled rectifier 79 is below the zero line and the current through the silicon controlled rectifier 82 is above the zero line.

The silicon controlled rectifier 66 is turned on at time $t_{20}$ after the silicon controlled rectifier 79 is turned off; the silicon controlled rectifier 79 is turned off when the current through the rectifier 79 drops to zero. This is shown in FIG. 5e when the current through the capacitor 88 goes to zero.

Since the conditions in the gap vary due to debris in the gap and/or the gap distance changing, ionization cannot occur at the same time during every cycle. Thus, the illustration of the gap ionizing at time $t_{21}$ shows a longer period of time for ionization to occur than in the prior cycles.

The minimum starting current is determined by the magnitude of the resistance of the resistor 74'. The current at which the silicon controlled rectifier 79 is turned on whereby flow of current through the silicon controlled rectifier 66 ceases and the spark discharge is extinguished is determined by the magnitude of the resistor 76. The magnitude of the inductance 75 determines the rate of current rise or slope of the current. Thus, both the resistors 74' and 76 and the inductance 75 are variables.

An advantage of this invention is that it reduces the wear of the tool electrode. Another advantage of this invention is that it permits holes to be formed by electrical discharging machining without any problem of tapering of the holes. A further advantage of this invention is that it is less costly to form tool electrodes. Still another advantage of this invention is that no dielectric flow through the gap is needed in many instances.

For purpose of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A method for removing material from a conductive workpiece by spark discharges across a machining gap between the workpiece and a tool electrode, the method comprising:
    initiating a spark discharge across the gap by applying a voltage with a quickly attained predetermined starting current substantially greater than zero;
    maintaining a substantially constant current density across the gap during the spark discharge; and
    stopping the spark discharge after a predetermined period of time.

2. The method according to claim 1 in which the substantially constant current density is maintained by regulating the rate of increase of the current from the predetermined starting current during the spark discharge.

3. The method according to claim 1 in which the spark discharge is stopped when a predetermined maximum current is reached.

4. The method according to claim 2 in which the spark discharge is stopped when a predetermined maximum current is reached.

5. The method according to claim 1 in which the application of voltage is stopped if a short exists across the gap.

6. In an electrical machining apparatus for removing material from a conductive workpiece by spark discharges between the workpiece and a tool electrode, the improvement comprising:
    means to allow current to flow between the workpiece and the tool electrode when a predetermined voltage exists therebetween;
    means to quickly produce a predetermined minimum current substantially greater than zero between the workpiece and the tool electrode after start of current flow therebetween;
    means to control the rate of increase of current between the workpiece and the tool electrode to maintain a substantially constant current density during the existence of the spark discharge between the workpiece and the tool electrode; and
    means to stop the spark discharge between the workpiece and the tool electrode.

7. The apparatus according to claim 6 in which said stopping means is activated when the current between the workpiece and the tool electrode reaches a predetermined maximum value.

8. The apparatus according to claim 6 in which:
    said control means comprises an inductance in series with the tool electrode and the workpiece; and
    said producing means comprises a resistor connected in parallel with said inductance.

9. The apparatus according to claim 8 in which said stopping means is activated when the current between the workpiece and the tool electrode reaches a predetermined maximum value.

10. The apparatus according to claim 6 in which said producing means is variable to change the minimum predetermined current while maintaining it above zero.

11. The apparatus according to claim 6 in which said control means is variable whereby the rate of current increase may be changed.

12. The apparatus according to claim 6 including means to stop current flow between the workpiece and the tool electrode when this current increases too much.

UNITED STATES PATENT OFFICE
CERTIFICATE OF CORRECTION

Patent No. 3,588,431          Dated June 28, 1971

Inventor(s)  Adrianus J. Pekelharing et al.

It is certified that error appears in the above-identified patent and that said Letters Patent are hereby corrected as shown below:

Column 1, line 20, "$8 \times 10^1$" should read -- $8 \times 10^{-6}$ --; line 47, "$10^{16}$" should read -- $10^{-6}$ --. Column 3, line 26, "charges" should read -- charts --. Column 7, line 29, after "cross" cancel the hyphen. Column 9, line 27, "nonconductive" should read -- non-conductive --. Column 11, line 59, "resistor" should read -- resistors --.

Signed and sealed this 7th day of March 1972.

(SEAL)
Attest:

EDWARD M. FLETCHER, JR.          ROBERT GOTTSCHALK
Attesting Officer                Commissioner of Patents